United States Patent
Patel et al.

(10) Patent No.: US 6,465,068 B1
(45) Date of Patent: *Oct. 15, 2002

(54) MULTILAYER COEXTRUDED MATERIAL FOR MEDICAL GRADE PRODUCTS AND PRODUCTS MADE THEREFROM

(75) Inventors: Indrajit Patel, Algonquin; Harold Bowerman, Libertyville; Larry Rosenbaum, Gurnee; Rich Mennenoh, McHenry; Pat Ryan, Crystal Lake, all of IL (US)

(73) Assignee: Baxter International Inc, Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/660,970

(22) Filed: Sep. 13, 2000

Related U.S. Application Data

(62) Division of application No. 07/828,083, filed on Jan. 30, 1992.

(51) Int. Cl.$^7$ .................. A61M 25/00; A61M 25/10
(52) U.S. Cl. .............. 428/36.91; 428/35.9; 428/34.3; 428/35.2; 428/35.4; 428/36.6
(58) Field of Search ............... 428/34.3, 35.2, 428/35.4, 35.9, 36.6, 36.91

(56) References Cited

U.S. PATENT DOCUMENTS

| | | | | |
|---|---|---|---|---|
| 3,995,084 A | * | 11/1976 | Berger et al. ............ 428/35 |
| 4,087,587 A | * | 5/1978 | Shida et al. ............ 428/500 |
| 4,087,588 A | * | 5/1978 | Shida et al. ............ 428/500 |
| 4,233,367 A | * | 11/1980 | Ticknor et al. .......... 428/476.3 |
| 4,322,465 A | * | 3/1982 | Webster ............... 428/194 |
| 4,327,726 A | * | 5/1982 | Kwong et al. ........... 128/272 |
| 4,407,888 A | * | 10/1983 | Crofts ................ 428/355 |
| 4,417,753 A | * | 11/1983 | Bacehowski et al. ...... 285/21 |
| 4,479,989 A | * | 10/1984 | Mahal ................ 428/35 |
| 4,521,437 A | * | 6/1985 | Storms ............... 426/130 |
| 4,562,118 A | * | 12/1985 | Maruhashi et al. ...... 428/412 |
| 4,627,844 A | * | 12/1986 | Schmitt .............. 604/264 |
| 4,643,926 A | * | 2/1987 | Mueller .............. 428/35 |
| 4,707,389 A | * | 11/1987 | Ward ................ 428/36 |
| 4,724,028 A | * | 2/1988 | Zabielski et al. ........ 156/256 |
| 4,734,327 A | * | 3/1988 | Vicik ............... 428/332 |
| 4,735,855 A | | 4/1988 | Wofford et al. ........ 428/349 |
| 4,753,222 A | * | 6/1988 | Morishita ............. 128/4 |
| 4,764,404 A | * | 8/1988 | Genske et al. ......... 428/35 |
| 4,767,651 A | * | 8/1988 | Starczewski et al. .... 428/35 |
| 4,772,497 A | * | 9/1988 | Maasola ............. 428/35 |
| 4,778,697 A | * | 10/1988 | Genske et al. ......... 428/35 |
| 4,803,102 A | * | 2/1989 | Raniere et al. ........ 428/35.2 |
| 4,834,755 A | * | 5/1989 | Silvestrini et al. ....... 623/13 |
| 4,915,893 A | * | 4/1990 | Gogolewski et al. ..... 264/211 |
| 4,923,470 A | * | 5/1990 | Dumican ............. 623/11 |
| 4,996,054 A | * | 2/1991 | Pietsch et al. ......... 424/422 |
| 5,026,347 A | * | 6/1991 | Patel ................ 604/410 |
| 5,085,649 A | * | 2/1992 | Flynn ................ 604/282 |
| 5,100,401 A | * | 3/1992 | Patel ................ 604/410 |
| 6,149,997 A | * | 11/2000 | Patel et al. ........... 428/36.91 |

FOREIGN PATENT DOCUMENTS

| | | | |
|---|---|---|---|
| EP | 0 380 270 A3 | * | 8/1990 |
| GB | 2016274 | | 9/1979 |
| GB | 2016274 A | * | 9/1979 |
| JP | 22 833 46 A | | 11/1990 |
| WO | 92/11820 | | 7/1992 |
| WO | WO 9211820 | * | 7/1992 |

* cited by examiner

*Primary Examiner*—Harold Pyon
*Assistant Examiner*—Marc Patterson
(74) *Attorney, Agent, or Firm*—Mark J. Buonaiuto; Robert Barrett

(57) ABSTRACT

The present invention provides a non-PVC, non-DEHP material that can be used for medical grade tubing. Additionally, the present invention provides medical grade tubing made from such a material. To this end, the present invention provides a medical grade tubing comprising a multilayer coextruded structure including: a layer comprising a blend of polyurethane and polyester; and a layer comprising a blend chosen from the group consisting of: polypropylene, ethylenevinyl acetate, and polyurethane; polypropylene and styrene-ethylene-butylene-styrene; polypropylene, styrene-ethylene-butylene-styrene, and ethylenevinyl acetate; polypropylene, ethylenevinyl acetate, styrene-ethylene-butylene-styrene, and thermoplastic polyester elastomer; polypropylene, ethylenevinyl acetate, styrene-ethylene-butylene-styrene, thermoplastic polyester elastomer, and polyurethane; polyester, thermoplastic polyester elastomer, and polyurethane; polyester and polyurethane; and polypropylene, styrene-ethylene-butylene-styrene, and polyurethane.

28 Claims, 1 Drawing Sheet

MULTILAYER COEXTRUDED MATERIAL FOR MEDICAL GRADE PRODUCTS AND PRODUCTS MADE THEREFROM

This Application is a division of Ser. No. 07/828,088 filed Jan. 30, 1992.

BACKGROUND OF THE INVENTION

The present invention relates generally to medical products and compositions for making same. More specifically, the present invention relates to non-PVC material and medical tubing made therefrom.

It is known to use closures for blood containers and IV containers that consist of membrane tubes. In this regard, once a drug container is filled through an open-ended filling port, a membrane tube closure is coated with a solvent, such as cyclohexanone, and inserted into a fill port tubing. During this process, a chemical bond is achieved between the fill port and the membrane tube closure. When it is desired to access the container, an end user pierces the membrane, in the tube, to allow drug administration or other access to the container.

Typically, such a medical membrane tubing is constructed from plasticized polyvinyl chloride (PVC). Usually, the PVC is plasticized with DEHP.

Recently, there has been concern with respect to the use of DEHP plasticized PVC. DEHP has been alleged to be a suspected carcinogen. However, the characteristics that are afforded by plasticized PVC are very desirable especially in the medical area and for uses such as in a membrane tube closure for a container.

In this regard, such medical tubings should exhibit certain characteristics. It is desirable that the tubing can be solvent bonded to a PVC container as well as containers constructed from other alloys. It is also desirable that the tubing is RF sealable to form membrane tube closures so as to be usable with current manufacturing equipment.

Additionally, the materials should be autoclavable without cross-linking at 121° C. Further, it would be desirable if the tubing was compatible with currently used manufacturing machines. Moreover, the material should be sterilizable via either ETO or gamma sterilization processes. Likewise, in order to be a usable membrane tube closure, the material must be easy to pierce during drug administration and allow the spike to be removed after the drug is administered. Additionally, it is desirable that the scrap is recyclable for further use.

Although there are other components in the art from which, arguably, medical tubing could be created, each of these components suffers disadvantages. Most importantly, the resultant product does not have the same desirable characteristics as a plasticized PVC product.

For example, flexible polyester is not as RF responsive as is plasticized PVC. Aliphatic polyurethane is not autoclavable. Further, such tubings, due to their characteristics, cannot be used on currently available commercial machinery in, for example, a blood collection system.

U.S. patent application Ser. No. 07/270,006, filed Nov. 14, 1988, discloses a citrate ester and a non-PVC material. U.S. patent application Ser. No. 07/494,045, filed. May 15, 1990, is a divisional application to that patent application. Both of these applications are assigned to the assignee of the present invention.

U.S. patent application Ser. No. 07/636,337, filed Dec. 31, 1990, and assigned to the assignee of the present invention, relates to a medical grade tubing comprising a blend of polyurethane and polyester, and the resultant tubing being autoclavable and RF sealable. A continuation-in-part to that patent application, U.S. Ser. No. 07/828,436, now U.S. Pat. No. 5,533,992, is being filed on the same day as this patent application.

SUMMARY OF THE INVENTION

The present invention provides a non-PVC, non-DEHP material that can be used for medical grade tubing. Additionally, the present invention provides medical grade tubing made from such a material.

The resultant tubing of the present invention exhibits the characteristics that are desirable for medical grade tubing. These characteristics include being RF responsive to form membrane tube closures with present manufacturing equipment. The material is solvent bondable to itself, as well as plasticized PVC. The material can be autoclaved without cross-linking at 121° C. The scrap is recyclable for future use.

The material can be sterilized via steam, gamma, E beam, or ETO sterilization processes. The material, when it forms a membrane, is easy to pierce during drug administration. Additionally, it is easy to remove a spike from the tubing after the drug is administered. Further, the tube is flexible and contact clear.

Additionally, an advantage of the material is that it is a multilayer coextruded tubing that does not contain PVC or plasticizer.

To this end, the present invention provides a medical grade tubing comprising a multilayer coextruded structure including: a layer comprising a blend of polyurethane and polyester; and at least a layer comprising a blend chosen from the group consisting of: polypropylene, ethylenevinyl acetate, and polyurethane; polypropylene and styrene-ethylene-butylene-styrene; polypropylene, styrene-ethylene-butylene-styrene, and ethylenevinyl acetate; polypropylene, ethylenevinyl acetate, styrene-ethylene-butylene-styrene, and thermoplastic polyester elastomer; polypropylene, ethylenevinyl acetate, styrene-ethylene-butylene-styrene, thermoplastic polyester elastomer, and polyurethane; polyester, thermoplastic polyester elastomer, and polyurethane; polyester and polyurethane; and polypropylene, styrene-ethylene-butylene-styrene, and polyurethane.

In an embodiment, the multilayer coextruded structure comprises: a first layer comprising a blend of polypropylene, ethylenevinyl acetate, and polyurethane; and a second layer comprising a blend of polyurethane and polyester.

In an embodiment, the multilayer coextruded structure comprises: a first layer comprising a blend of polypropylene and styrene-ethylene-butylene-styrene; a second layer comprising a blend of polyurethane and polyester; and a tie layer between the first and second layer.

In an embodiment, the multilayer coextruded structure comprises: a first layer comprising a blend of polypropylene, styrene-ethylene-butylene-styrene, and ethylenevinyl acetate; a second layer comprising a blend of polyurethane and polyester; and a tie layer between the first and second layers.

In an embodiment, the multilayer coextruded structure comprises: a first layer comprising a blend of polypropylene, ethylenevinyl acetate, and polyurethane; a second layer comprising a blend of polyurethane and polyester; and a tie layer between the first and second layers.

In an embodiment, the multilayer coextruded structure comprises: a first layer comprising a blend of polyester and polyurethane; a second layer comprising a blend of polypropylene, ethylenevinyl acetate, and polyurethane; and a third layer comprising a blend of polyester and polyurethane.

In an embodiment, the multilayer coextruded structure comprises: a first layer comprising a blend of polyester, thermoplastic polyester elastomer, and polyurethane; a second layer comprising a blend of polypropylene, ethylenevinyl acetate, and polyurethane; and a third layer comprising a blend of polyester and polyurethane.

In an embodiment, the multilayer coextruded structure comprises: a first layer comprising-a blend of polypropylene, ethylenevinyl acetate, styrene-ethylene-butylene-styrene, and thermoplastic polyester elastomer; a second layer comprising a blend of polypropylene, ethylenevinyl acetate, and polyurethane; and a third layer comprising a blend of polyester and polyurethane.

In an embodiment, the multilayer coextruded structure comprises: a first layer comprising a blend of polyester and polyurethane; a second layer comprising a blend of polypropylene, styrene-ethylene-butylene-styrene, and polyurethane; and a third layer comprising a blend of polyester and polyurethane.

In an embodiment, the multilayer coextruded structure comprises: a first layer comprising a blend of polyester, thermoplastic polyester elastomer, and polyurethane; a second layer comprising a blend of polypropylene, styrene-ethylene-butylene-styrene, and polyurethane; and a third layer comprising a blend of polyester and polyurethane.

In an embodiment, the multilayer coextruded structure comprises: a first layer comprising a blend of polypropylene, ethylenevinyl acetate, styrene-ethylene-butylene-styrene, and thermoplastic polyester elastomer; a second layer comprising a blend of polypropylene, styrene-ethylene-butylene-styrene, and polyurethane; and a third layer comprising a blend of polyester and polyurethane.

In an embodiment, the multilayer coextruded structure comprises: a first layer comprising a blend of polypropylene, ethylenevinyl acetate, styrene-ethylene-butylene-styrene, and thermoplastic polyester elastomer; a second layer comprising a blend of polypropylene, styrene-ethylene-butylene-styrene, and polyurethane; and a third layer comprising a blend of polyester and polyurethane.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
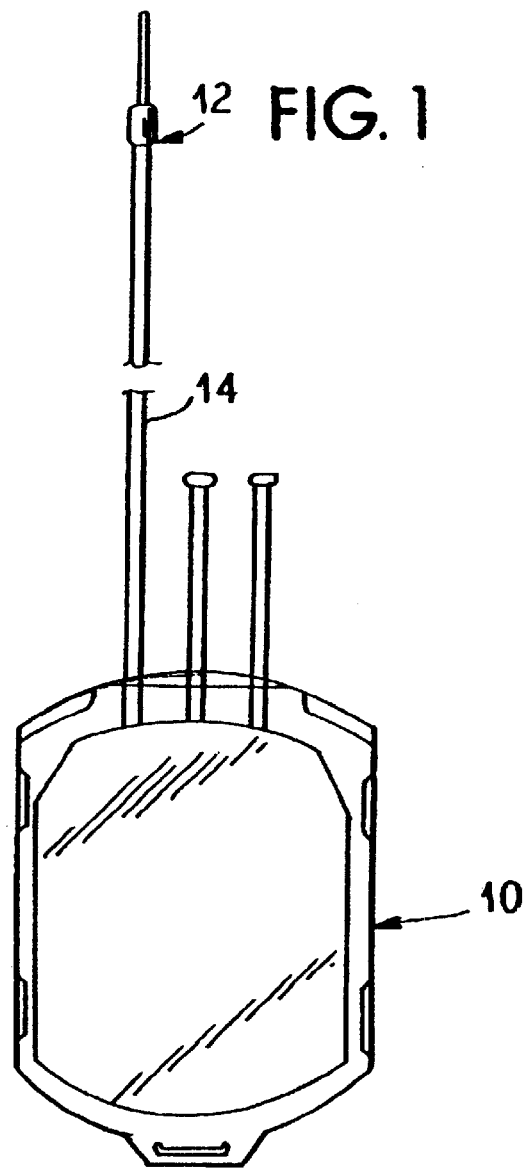
FIG. 1 illustrates a container containing an embodiment of a medical grade tubing of the present invention.

A non-PVC, non-DEHP coextruded multilayer material is provided for medical grade tubing. The material comprises a multilayer structure having at least one layer comprising a blend of polyurethane and polyester. The resultant tubing exhibits desirable characteristics for use as a medical grade tubing.

Accordingly, the resultant tubing can be utilized for applications which heretofore have been filled in the marketplace by DEHP plasticized PVC tubing. Additionally, the material of the present invention is extrudable, injection moldable, and blow moldable. Because it is a non-PVC, non-DEHP material, it eliminates the environmental concerns of acid rain and the alleged carcinogenic concerns of DEHP.

It has been found that the resultant tubing of the present invention can be solvent bonded to itself and also to PVC material that is currently utilized by using cyclohexanone. Additionally, the tubing is RF sealable allowing the tubing to create a membrane closure. Furthermore, the material can be sterilized using steam, gamma, E beam, or ETO sterilization processes.

As set forth in detail hereinafter, a variety of different, structures can be created pursuant to the present invention. All of the structures, however, include a multilayer structure having at least one layer comprising polyester and polyurethane. To this end, the following structures can be utilized, each structure being a multilayer coextruded structure:

Polypropylene+ethylenevinyl acetate+polyurethane/polyester+polyurethane;

Polypropylene+styrene-ethylene-butylene-styrene/polypropylene+ethylenevinyl acetate+styrene-ethylene-butylene-styrene+copolyester/polyester+polyurethane;

Polypropylene+styrene-ethylene-butylene-styrene+ethylenevinyl acetate/polypropylene+ethylenevinyl acetate+styrene-ethylene-butylene-styrene+copolyester/polyester+polyurethane;

Polypropylene+ethylenevinyl acetate+polyurethane/polypropylene+ethylenevinyl acetate+styrene-ethylene-butylene-styrene+copolyester/polyester+polyurethane;

Polyester+polyurethane/polypropylene+ethylenevinyl acetate+polyurethane/polyester+polyurethane;

Polyester+thermoplastic polyester elastomer+polyurethane/polypropylene+ethylenevinyl acetate+polyurethane/polyester+polyurethane;

Polypropylene+ethylenevinyl acetate+styrene-ethylene-butylene-styrene+thermoplastic elastomer/polypropylene+ethylenevinyl acetate+polyurethane/polyester+polyurethane;

Polypropylene+ethylenevinyl acetate+styrene-ethylene-butylene-styrene+thermoplastic polyester elastomer+polyurethane/polypropylene+ethylenevinyl acetate+polyurethane/polyester+polyurethane;

Polyester+polyurethane/polypropylene+styrene-ethylene-butylene-styrene+polyurethane/polyester+polyurethane;

Polyester+thermoplastic polyester elastomer+polyurethane/polypropylene+styrene-ethylene-butylene-styrene+polyurethane/polyester+polyurethane;

Polypropylene+ethylenevinyl acetate+styrene-ethylene-butylene-styrene+thermoplastic polyester elastomer/polypropylene+styrene-ethylene-butylene-styrene+polyurethane/polyester+polyurethane;

Polypropylene+ethylenevinyl acetate+styrene-ethylene-butylene-styrene+thermoplastic polyester elastomer+polyurethane/polypropylene+styrene-ethylene-butylene-styrene+polyurethane/polyester+polyurethane.

In the above structures, the first blend refers to the outer layer and the last blend refers to the core or inside layer.

Preferably, the layers have the following thicknesses: outer layer approximately 0.004 to about 0.006 inches; tie layer approximately 0.001 to about 0.003 inches; and core layer approximately 0.025 to about 0.030 inches.

By way of example, and not limitation, examples of the present invention will now be set forth.

EXAMPLE

In this Example, membrane tubes were constructed using the multilayer structures of the present invention and were compared to current PVC membrane tubes.

The initial and final measurements for each dimension for the assembly system were reviewed. Also, nine final product tests were conducted; they were as follows: 1) Final Membrane Thickness (after RF operation); 2) Membrane Break Force; 3) Leak Testing; 4) Spike Insertion Force; 5) Spike Removal Force; 6) Peel Testing of Membrane; 7) Solvent Bond Testing; 8) Pinch Cap Application; and 9) Sleeve Stopper Application.

The tests that were performed are as follows:

1) Membrane Thickness—After RF operation. A membrane thickness is measured by drop gauge or caliper which predicts the functionality of membrane tube assembly, such as RF sealability, ease of spiking, stand against pressure leak test within required limit.

2) and 3) Membrane Break Force, Leak Test—After manufacturing. The membrane tube assembly (selected sample size) will be challenged under pressure from 15 psi to failure. The test result will determine seal integrity, also strength of seal and membrane to stand autoclaving pressure.

4) Spike Insertion—A spike is mounted on special designed fixture with gauge. This test will detect how much force is required to puncture the membrane based on test results. A prediction can be made for actual usage in the field.

5) Spike Removal Force—Units used in the spike insertion test were also measured for spike removal force for each of the ten parts.

6) Peel Test—is an indication of true heat seal bond between the membrane and membrane tube. If RF heat seal process is not within the processing window, the membrane may peeled off during autoclaving. A peel test was conducted on the membrane tube. The membrane tube was cut lengthwise. The membrane was grabbed by needle nose pliers and attempted to be peeled from the tube. It was then noted if the membrane: 1) peels the seal; 2) tears at the seal; or 3) tears elsewhere.

7) Solvent Bond Test—which will determine the solvent seal integrity between membrane tube and fill port during filling. A bag is filled with solution through fill port. As filling is completed, a membrane tube is attached to fill port via solvent. Cyclohex solvent was used in this test to determine if the membrane tube can be solvent bonded into the port tube. The membrane tube was inserted, with cyclohex, half-way into the port tube. PVC membrane/port tube assemblies were also made. Units were sterilized in a prototype autoclave vessel. ½ hour heat with ½ hour overpressure. Both sets of assemblies were tested by cutting the assembly lengthwise, and measuring the peel force between the interface using an Instron machine. These tests were conducted at: 1) 1 minute after assembly; 2) 1 hour after assembly; and 3) 24 hours after assembly.

8) Pinch Cap Application—The pinch cap is being used over the membrane tube assembly as a tip protector. The purpose of this test was to determine whether the present pinch cap is compatible with the membrane tube assembly or (made from new material) not. Ten pinch caps were applied using 70% ISO (isopropyl alcohol) and water, and ten without ISO and water. Units were then sterilized in a prototype autoclave vessel, ½ hour heat with ½ hour overpressure. Units were leak tested and removal force of pinch cap was measured.

9) Sleeve Stopper Application—In a Baxter Healthcare system, the sleeve stopper is used as an injection site over membrane tube assembly for administration of drug or solution into the filled container. Ten sleeve stoppers were applied including the shrink band. Units were then sterilized in ½ hour heat with ½ hour overpressure. Units were leak tested.

|  | Power 0–100 | Time 1–2 Seconds | Membrane Thickness .001"–.015" |
|---|---|---|---|
| A = | 20 | 1.5 | .008 |
| B = | 20 | 2.0 | .008 |
| C = | 30 | 1.0 | .008 |
| D = | 40 | 1.0 | .008 |
| E = | 40 | 1.5 | .008 |
| F = | 50 | 1.0 | .008 |

Group A–F

Each group 'A' through 'F' identifies the heat seal condition of RF heat seal process. The material of the membrane tube assembly is polypropylene+styrene-ethylene-butylene-styrene/polypropylene+ethylenevinyl acetate+styrene-ethylene-butylene-styrene+thermoplastic polyester elastomer/PCCE+polyurethane in each group. For example, in Group 'A', powersetting–20, heat seal time–1.5 seconds, membrane thickenss–0.008". The test results of each group was compared with present PVC membrane tube.

RESULTS:

1) Final Membrane Thickness—The final membrane thickness varied for all size RF process set-ups. Again, the initial settings are for 0.008" thick. Averages for each set up are listed below for each group.

| A | B | C | D | E | F |
|---|---|---|---|---|---|
| .0088" | .0083" | .0095" | .0088" | .0109" | .0064" |

2) Membrane/Break Force—The average break force for PVC was 8.69 lbs. and the average elongation was 0.308 inches. The range of break force for the compositions of the present invention was 8.66 lbs. to 21.14 lbs. The average for each group is listed below:

| Group | A | B | C | D | E | F |
|---|---|---|---|---|---|---|
| lbs. | 11.51 | 13.65 | 15.65 | 15.13 | 17.42 | 11.39 |
| Elong. | .333" | .404" | .426" | .427" | .449" | .395" |

3) Leak Test—Pressure test (to test the membrane disk/ membrane tube interface). Results are listed below.

| Group   | A    | B    | C    | D    | E    | F    |
|---------|------|------|------|------|------|------|
| Leakers | 0/10 | 0/10 | 0/10 | 0/10 | 0/10 | 0/10 |

All units in each group passed the required 8 psi air leak test.

4) Insertion—The average spike insertion force for PVC (10 units tested) is 3.182 lbs. The average spike insertion force for the compositions of the present invention is 5.696 lbs. Note: Group E was used for the test comparison of Insertion force.

5) Removal—The average spike removal force for PVC (10 units tested) is 2.450 lbs. The average spike removal force for the compositions of the present invention is 5.696 lbs. Note: Group E was used for the test comparison of removal force.

6) Peel Test—The results of the peel test are listed below for each group.

|         | peeled @ seal | tore @ seal | tore elsewhere |
|---------|---------------|-------------|----------------|
| Group A | 3/10          | 3/10        | 4/10           |
| Group B | 0/10          | 1/10        | 9/10           |
| Group C | 3/10          | 2/10        | 5/10           |
| Group D | 0/10          | 3/10        | 7/10           |
| Group E | 2/10          | 1/10        | 7/10           |
| Group F | 0/10          | 2/10        | 8/10           |

7) Solvent Bond Test—

|            | PVC         | PCCE + PU   |
|------------|-------------|-------------|
| @ 1 minute | 0/10 failed | 9/10 failed |
| @ 1 hour   | 0/10 failed | 0/10 failed |
| @ 24 hours | 0/10 failed | 0/10 failed |

B) Bond Force (peel test): Average for 8 units Note: 2 units were sacrificed in the test set-up.

| PVC       | PCCE + PU |
|-----------|-----------|
| 3.305 lbs.| 6.467 lbs.|

Note: For PCCE+PU material, force was much higher when membrane of membrane tube was located near or inside of port tube.

8) Pinch Cap—Much deformation was found on both the PVC and the composition of the present invention following sterilization. It was understood that the sterilizer exhibits or exceeds a worst case condition. However, units were still tested for leakage and removal force.

| PVC | Compositions Pursuant to The Present Invention with ISO | Compositions Pursuant to The Present Invention without ISO |
|---|---|---|
| A) Leakage: | | |
| 0/5 | 1/10 | 0/10 |
| B) Removal force (average): | | |
| .250 | 1.549 | 1.323 |

9) Sleeve Stopper—
Leak testing—
PVC: 0/10 failed
Compositions Constructed
Pursuant to the Present Invention: 0/10 failed The test results demonstrate that the membrane tube assembly made of PCCE+PU alloy performed as well as presently used PVC membrane tube assemblies. However, by reducing membrane thickness, the break force should be reduced as well as elongation. By reducing membrane tube wall thickness, insertion and removal force of the spike should be reduced. The membrane diameter should be decreased to approximately 0.018" to help the insertion of the disk into the membrane tube for the RF operation.

Figure 2:
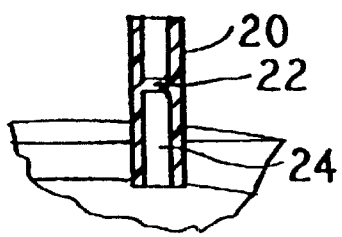
FIG. 2 illustrates a perspective view of a tubing and membrane constructed pursuant to the present invention.

FIG. 1 illustrates a medical grade container 10 and set 12 including a tubing 14 fabricated from the material of the present invention. The container 10 can be constricted from PVC or other material. The tubing 14 of the present invention is constructed from the composition of the present invention that allows the tubing to be solvent bonded to the container 10. Additionally, the material allows the product to be autoclaved. Also, the formulations can be used for creating a tubing 20 and membrane 22 as illustrated in FIG. 2.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A non-PVC, non-DEHP material for use in manufacturing medical grade tubing comprising a multilayer coextruded structure comprising:
a layer including a blend of polyurethane and polyester;
a tie layer: and
at least a second layer comprising a blend chosen from the group consisting of: polypropylene, ethylenevinyl acetate, and polyurethane; polypropylene and styrene-ethylene-butylene-styrene; polypropylene, styrene-ethylene-butylene-styrene, and ethylenevinyl acetate; polypropylene, ethylenevinyl acetate, styrene-ethylene-butylene-styrene, and thermoplastic polyester elastomer; polypropylene, ethylenevinyl acetate, styrene-ethylene-butylene-styrene, thermoplastic polyester elastomer, and polyurethane; polyester thermoplastic polyester elastomer, and polyurethane; polyester and polyurethane; and polypropylene, styrene-ehtylene-butylene-styrene, and polyurethane.

2. A container including a medical grade tubing comprising:

a container constructed from a plastic material; and a multilayer coextruded structure that does not include PVC or DEHP including a layer comprising a blend of polyurethane and polyester a tie layer and at least one layer comprising a blend chosen from the group consisting of: polypropylene, ethylenevinyl acetate, and polyurethane; polypropylene and styrene-ethylene-butylene-styrene; polypropylene, styrene-ethylene-butylene-styrene, and ethylenevinyl acetate; polypropylene, ethylenevinyl acetate, styrene-ethylene-butylene-styrene, and thermoplastic polyester elastomer; polypropylene, ethylenevinyl acetate, styrene-ethylene-butylene-styrene, thermoplastic polyester elastomer, and polyurethane; polyester thermoplastic polyester elastomer, and polyurethane; polyurethane and polyester; and polypropylene, styrene-ehtylene-butylene-styrene, and polyurethane.

3. The non-PVC, non-DEHP material of claim 1 wherein the multilayer coextruded structure comprises:

a first layer comprising a blend of polypropylene, ethylenevinyl acetate, and polyurethane; and a second layer comprising a blend of polyurethane and polyester.

4. The non-PVC, non-DEHP material of claim 1 wherein the multilayer coextruded structure comprises:

a first layer comprising a blend of polypropylene, styrene-ethylene-butylene-styrene;

a second layer comprising a blend of polyurethane and polyester; and a tie layer between the first and second layer.

5. The non-PVC, non-DEHP material of claim 1 wherein the multilayer coextruded structure comprises:

a first layer comprising a blend of polypropylene, styrene-ethylene-butylene-styrene, and ethylenevinyl acetate;

a second layer comprising a blend of polyurethane and polyester; and a tie layer between the first and second layers.

6. The non-PVC, non-DEHP material of claim 1 wherein the multilayer coextruded structure comprises:

a first layer comprising a blend of polypropylene, ethylenevinyl acetate, and polyurethane;

a second layer comprising a blend of polyurethane and polyester; and a tie layer between the first and second layers.

7. The non-PVC, non-DEHP material of claim 1 wherein the multilayer coextrnded structure comprises:

a first layer comprising a blend of polypropylene, ethylenevinyl acetate, and polyurethane;

a second layer comprising a blend of polyurethane and polyester; and a tie layer between the first and second layers.

8. The non-PVC, non-DEHP material of claim 1 wherein the multilayer coextruded structure comprises:

a first layer comprising a blend of polyester and polyurethane;

a second layer comprising a blend of polypropylene, ethylenevinyl acetate, and polyurethane; and a third layer comprising a blend of polyester and polyurethane.

9. The non-PVC, non-DEHP material of claim 1 wherein the multilayer coextruded structure comprises:

a first layer comprising a blend of polyester, thermoplastic polyester elastomer, and polyurethane;

a second layer comprising a blend of polypropylene, ethylenevinyl acetate, and polyurethane; and a third layer comprising a blend of polyester and polyurethane.

10. The non-PVC, non-DEHP material of claim 1 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, ethylenevinyl acetate, and polyurethane; and a third layer comprising a blend of polyester and polyurethane.

11. The non-PVC, non-DEHP material of claim 1 wherein the multilayer coextruded structure comprises:

a first layer comprising a blend of polyester and polyurethane;

a second layer comprising a blend of polypropylene, styrene-ethylene-butylene-styrene, and polyurethane; and a third layer comprising a blend of polyester and polyurethane.

12. The non-PVC, non-DEHP material of claim 1 wherein the multilayer coextruded structure comprises:

a first layer comprising a blend of polyester, thermoplastic polyester elastomer, and polyurethane;

a second layer comprising a blend of polypropylene, styrene-ethylene-butylene-styrene, and polyurethane; and a third layer comprising a blend of polyester and polyurethane.

13. The non-PVC, non-DEBT material of claim 1 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, styrene-ethylene-butylene-styrene, and polyurethane; and a third layer comprising a blend of polyester and polyurethane.

14. The non-PVC, non-DEHP material of claim 1 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, styrene-ethylene-butylene-styrene, and polyurethane; and a third layer comprising a blend of polyester and plyurethane.

15. The non-PVC, non-DEHP material of claim 1 wherein the multilayer coextruded structure comprises:

an outer layer having a thickness of approximately .004 to about .006 inches;

a tie layer of approximately .001 to about .003; and a core layer of approximately .025 inches to about .030 inches.

16. The container of claim 2 wherein the multilayer coextruded structure comprises:

a first layer comprising a blend of polypropylene, ethylenevinyl acetate, and polyurethane; and a second layer comprising a blend of polyurethane and polyester.

17. The container of claim 2 wherein the multilayer coextruded structure comprises:

a first layer comprising a blend of polypropylene, styrene-ethylene-butylene-styrene;

a second layer comprising a blend of polyurethane and polyester; and a tie layer between the first and second layer.

18. The container of claim 2 wherein the multilayer coextruded structure comprises:

a first layer comprising a blend of polypropylene, styrene-ethylene-butylene-styrene, and ethylenevinyl acetate;

a second layer comprising a blend of polyurethane and polyester; and a tie layer between the first and second layers.

19. The container of claim 2 wherein the multilayer coextruded structure comprises:

a first layer comprising a blend of polypropylene, ethylenevinyl acetate, and polyurethane;

a second layer comprising a blend of polyurethane and polyester; and a tie layer between the first and second layers.

20. The container of claim 2 wherein the multilayer coextruded structure comprises:

a first layer comprising a blend of polypropylene, ethylenevinyl acetate, and polyurethane;

a second layer comprising a blend of polyurethane and polyester; and a tie layer between the first and second layers.

21. The container of claim 2 wherein the multilayer coextruded structure comprises:

a first layer comprising a blend of polyester and polyurethane;

a second layer comprising a blend of polypropylene, ethylenevinyl acetate, and polyurethane; and a third layer comprising a blend of polyester and polyurethane.

22. The container of claim 2 wherein the multilayer coextruded structure comprises:

a first layer comprising a blend of polyester, thermoplastic polyester elastomer, and polyurethane;

a second layer comprising a blend of polypropylene, ethylenevinyl acetate, and polyurethane; and a third layer comprising a blend of polyester and polyurethane.

23. The container of claim 2 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, ethylenevinyl acetate, and polyurethane; and a third layer comprising a blend of polyester and polyurethane.

24. The container of claim 2 wherein the multilayer coextruded structure comprises:

a first layer comprising a blend of polyester and polyurethane;

a second layer comprising a blend of polypropylene, styrene-ethylene-butylene-styrene, and polyurethane; and a third layer comprising a blend of polyester and polyurethane.

25. The container of claim 2 wherein the multilayer coextruded structure comprises:

a first layer comprising a blend of polyester, thermoplastic polyester elastomer, and polyurethane;

a second layer comprising a blend of polypropylene, styrene-ethylene-butylene-styrene, and polyurethane; and a third layer comprising a blend of polyester and polyurethane.

26. The container of claim 2 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, styrene-ethylene-butylene-styrene, and polyurethane; and a third layer comprising a blend of polyester and polyurethane.

27. The container of claim 2 wherein the multilayer coextruded structure comprises:

a first layer comprising a blend of polypropylene, ethylenevinyl acetate, styrene-ethylene-butylene-styrene, and thermoplastic polyester elastomer;

a second layer comprising a blend of polypropylene, styrene-ethylene-butylene-styrene, and polyurethane; and a third layer comprising a blend of polyester and plyurethane.

28. The container of claim 2 wherein the multilayer coextruded structure comprises:

an outer layer having a thickness of approximately .004 to about .006 inches;

a tie layer of approximately .001 to about .003; and a core layer of approximately .025 inches to about .030 inches.

* * * * *